(12) United States Patent
Marlin et al.

(10) Patent No.: US 9,560,264 B2
(45) Date of Patent: *Jan. 31, 2017

(54) DEVICE AND METHOD FOR PHOTO AND VIDEO CAPTURE

(71) Applicant: Snap Inc., Venice, CA (US)

(72) Inventors: Richard E. Marlin, Venice, CA (US); Michael J. Mathias, Venice, CA (US); Kristian D. Diakov, Venice, CA (US)

(73) Assignee: Snap Inc., Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,361

(22) Filed: Feb. 19, 2016

(65) Prior Publication Data

US 2016/0173763 A1 Jun. 16, 2016

Related U.S. Application Data

(63) Continuation of application No. 14/579,096, filed on Dec. 22, 2014, now Pat. No. 9,277,126, which is a continuation of application No. 13/596,041, filed on Aug. 27, 2012, now abandoned.

(51) Int. Cl.
| | |
|---|---|
| *H04N 5/232* | (2006.01) |
| *H04N 5/222* | (2006.01) |
| *G03B 17/00* | (2006.01) |
| *H04N 5/77* | (2006.01) |
| *H04N 9/79* | (2006.01) |

(Continued)

(52) U.S. Cl.
CPC ...... *H04N 5/23216* (2013.01); *H04N 5/23206* (2013.01); *H04N 5/23245* (2013.01); *H04N 5/23293* (2013.01); *H04N 5/772* (2013.01); H04N 1/212 (2013.01); H04N 9/7921 (2013.01); H04N 2101/00 (2013.01)

(58) Field of Classification Search
CPC .............. G06F 3/04842; G06F 3/04883; G06F 3/04886; H04N 5/23293
USPC .... 348/211.8, 333.01, 333.05, 376; 345/173; 396/298
See application file for complete search history.

(56) References Cited

U.S. PATENT DOCUMENTS

| | | |
|---|---|---|
| 6,919,927 B1 | 7/2005 | Hyodo et al. |
| 8,411,050 B2 | 4/2013 | Zalewski et al. |
| 8,428,453 B1 | 4/2013 | Spiegel et al. |

(Continued)

OTHER PUBLICATIONS

U.S. Appl. No. 13/596,041, filed Aug. 27, 2012, Device and Method for Photo and Video Capture.

(Continued)

*Primary Examiner* — Trung Diep
(74) *Attorney, Agent, or Firm* — Schwegman Lundberg & Woessner, P.A.

(57) ABSTRACT

A single user input element in an image capture device is used for both photo and video capture. Based on a first user interface activity, a timing reference is engaged at a first reference time. In a first case, photo capture is performed. In the first case, a second reference time is based on a second user interface activity, and the timing reference indicates a passage of time between the two reference times is shorter than a particular time interval. In a second case, video capture is performed. In the second case, the timing reference indicates a passage of time since the first reference time is equal to or longer than the particular time interval. Video capture is stopped based on a subsequent user interface activity. The user interface activities may comprise detecting actions based on the same type of physical manipulation of the single user input.

19 Claims, 10 Drawing Sheets

(51) Int. Cl.
*H04N 1/21* (2006.01)
*H04N 101/00* (2006.01)

(56) References Cited

U.S. PATENT DOCUMENTS

| | | |
|---|---|---|
| 9,277,126 B2 | 3/2016 | Marlin et al. |
| 2004/0061788 A1 | 4/2004 | Bateman |
| 2007/0040931 A1 | 2/2007 | Nishizawa |
| 2008/0025701 A1 | 1/2008 | Ikeda |
| 2009/0015703 A1 | 1/2009 | Kim et al. |
| 2010/0053096 A1 | 3/2010 | Son |
| 2010/0182248 A1 | 7/2010 | Chun |
| 2011/0157029 A1 | 6/2011 | Tseng et al. |
| 2014/0055633 A1 | 2/2014 | Marlin et al. |
| 2015/0109472 A1 | 4/2015 | Marlin et al. |

OTHER PUBLICATIONS

"U.S. Appl. No. 13/596,041, Examiner Interview Summary mailed Jan. 29, 2014", 3 pgs.
"U.S. Appl. No. 13/596,041, Examiner Interview Summary mailed Feb. 26, 2014", 2 pgs.
"U.S. Appl. No. 13/596,041, Notice of Allowance mailed Apr. 3, 2014", 13 pgs.
"U.S. Appl. No. 14/579,096, Final Office Action mailed Jul. 27, 2015", 18 pgs.
"U.S. Appl. No. 14/579,096, Non Final Office Action mailed Mar. 3, 2015", 6 pgs.
"U.S. Appl. No. 14/579,096, Response filed Jul. 6, 2015 to Non Final Office Action mailed Mar. 3, 2015", 5 pgs.
"U.S. Appl. No. 14/579,096, Response filed Oct. 27, 2015 to Final Office Action mailed Jul. 27, 2015", 3 pgs.
"Bigfoot Certificate of Service for Patent Interference No. 106,005 dated Oct. 19, 2015", 3 pgs.
"Bigfoot Priority Motion 1 (Judgement Based on Priority of Invention) for Patent Interference No. 106,005 dated Oct. 19, 2015", 84 pgs.
"Bigfoot Statement Regarding Oral Argument in Patent Interference No. 106,005 dated Jan. 30, 2015", 3 pgs.
"Bigfoot Updated Exhibit List in Patent Interference No. 106,005 dated Oct. 19, 2015", 7 pgs.
"Decision on Motions—37 C.F.R. § 41.125(a) in Patent Interference No. 106,005 entered Aug. 4, 2015", 41 pgs.
"Declaration of Dr. Ravin Balakrishnan in Support of Mojo Media's Opposition 1 in Patent Interference No. 106,005 dated Nov. 21, 2014", 67 pgs.
"Joint Statement of Settlement Discussions in Patent Interference No. 106,005 filed Aug. 22, 2014", 3 pgs.
"Joint Stipulation to Extend Time Periods 11-14 in Patent Interference No. 106,005 dated Sep. 28, 2015", 3 pgs.
"Joint Stipulation to Extend Time Periods 3-4 in Patent Interference No. 106,005 filed Oct. 30, 2014", 4 pgs.

"Junior Party's Updated Notice of Real Party-In-Interest in Patent Interference No. 106,005 dated Nov. 24, 2014", 2 pgs.
"Mojo Media Notice of Service of Exhibits 2001-2002 in Patent Interference No. 106,005 dated Nov. 21, 2014", 4 pgs.
"Mojo Media Opposition 1 in Patent Interference No. 106,005 dated Nov. 21, 2014", 33 pgs.
"Mojo Media, Inc's Amended Designation of Lead and Back-Up Lead Counsel in Patent Interference No. 106,005 dated Oct. 30, 2014", 3 pgs.
"Mojo Media, Inc.'s Corrected Amended Designation of Lead and Back-Up Lead Counsel in Patent Interference No. 106,005 dated Nov. 4, 2014", 3 pgs.
"Mojo Media, Inc.'s Motions List in Patent Interference No. 106,005 filed Jul. 21, 2014", 3 pgs.
"Notice of Filing of Mojo Media, Inc. Priority Statement in Patent Interference No. 106,005 filed Sep. 12, 2014", 3 pgs.
"Notice of Service of Mono Media, Inc. Priority Statement in Patent Interference No. 106,005 filed Sep. 15, 2014", 3 pgs.
"Notice of Stipulation to Change Time Periods 1-3 in Patent Interference No. 106,005 filed Aug. 27, 2014", 4 pgs.
"Order—Authorizing Motions 37 CFR § 41.121 in Patent Interference No. 106,005 entered Jul. 28, 2014", 5 pgs.
"Order—Miscellaneous Bd.R. 104(a) in Patent Interference No. 106,005 entered Aug. 19, 2014", 6 pgs.
"Order—Miscellaneous Bd.R. 104(a) in Patent Interference No. 106,005 entered Dec. 4, 2014", 85 pgs.
"Order—Priority Times—37 C.F.R. § 41.104(c) in Patent Interference No. 106,005 entered Aug. 4, 2015", 6 pgs.
"Power of Attorney or Revocation of Power of Attorney with a New Power of Attorney and Change of Correspondence Address (PTO/SB/81) for U.S. Appl. No. 13/596,041 dated Oct. 29, 2014", 2 pgs.
"Power of Attorney or Revocation of Power of Attorney with a New Power of Attorney and Change of Correspondence Address (PTO/SB/81A) for U.S. Pat. No. 8,428,453 dated Aug. 14, 2014", 2 pgs.
"Snapchat Amended Certificate of Service in Patent Interference No. 106,005 filed Dec. 23, 2014", 3 pgs.
"Snapchat Exhibit List in Patent Interference No. 106,005 filed Sep. 12, 2014", 577 pgs.
"Snapchat Motion 1 (for Judgement of No Interference-In-Fact) in Patent Interference No. 106,005 filed Sep. 12, 2014", 32 pgs.
"Snapchat Notice of Filing Priority Statement in Patent Interference No. 106,005 filed Sep. 12, 2014", 3 pgs.
"Snapchat Notice of Service of Supplemental Declaration of Andrew T. Cambell, Ph.D., in Support of Snapchat Reply 1 (For Judgment of No Interference-In-Fact) in Patent Interference No. 106,005 filed Jan. 13, 2015", 3 pgs.
"Snapchat Reply 1 (for Judgement of No Interference-In-Fact) in Patent Interference No. 106,005 filed Dec. 23, 2014", 20 pgs.
"Snapchat Request for Oral Argument in Patent Interference No. 106,005 filed Jan. 30, 2015", 3 pgs.
"Snapchat Updated Exhibit List in Patent Interference No. 106,005 filed Dec. 23, 2014", 4 pgs.
"Snapchat, Inc.'s Amended Designation of Lead and Back-Up Lead Counsel in Patent Interference No. 106,005 dated Aug. 15, 2014", 3 pgs.
"U.S. Appl. No. 14/579,096, Notice of Allowance mailed Jan. 5, 2016", 7 pgs.

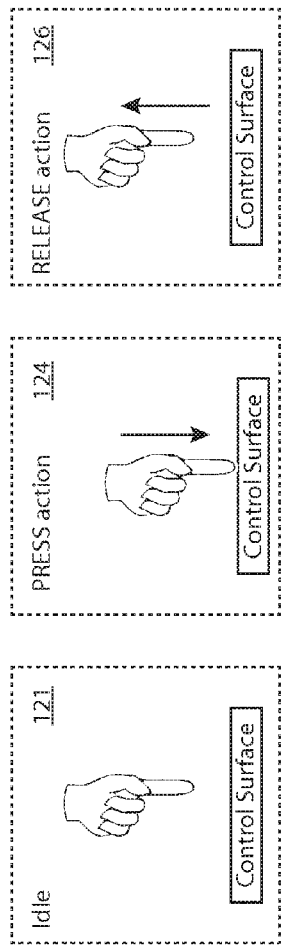
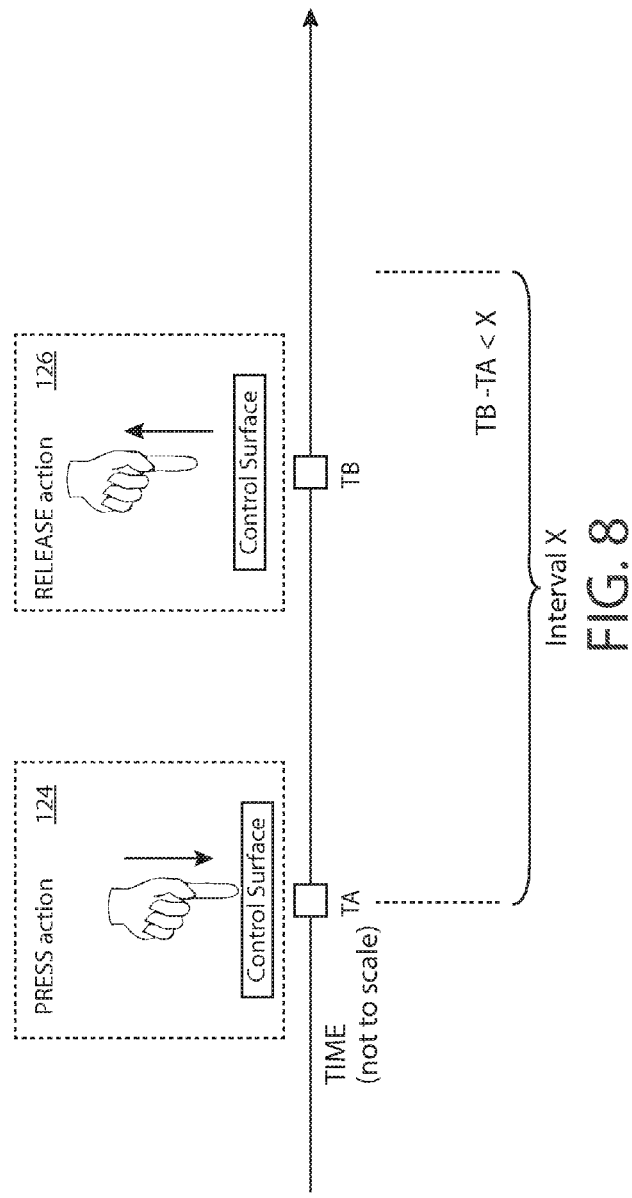

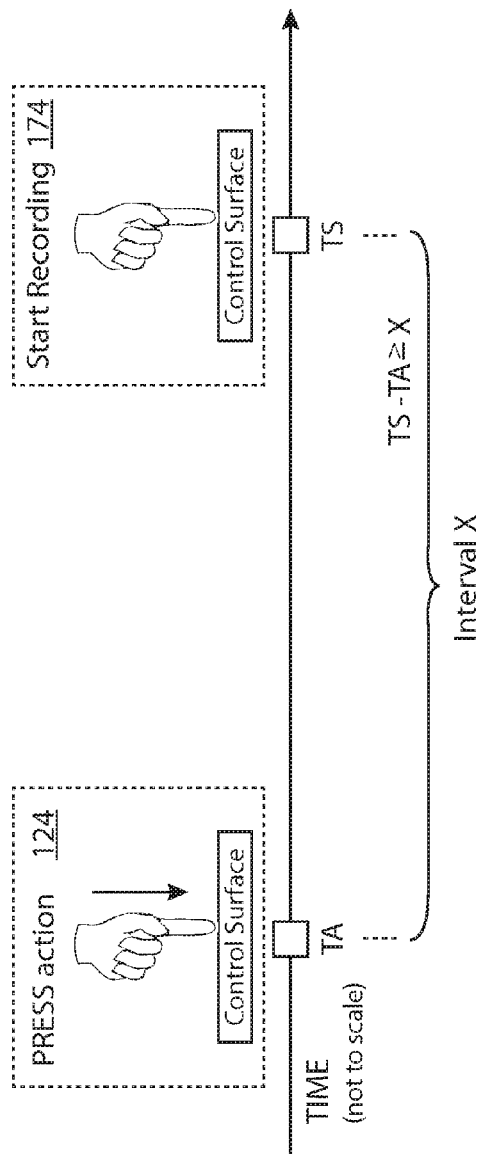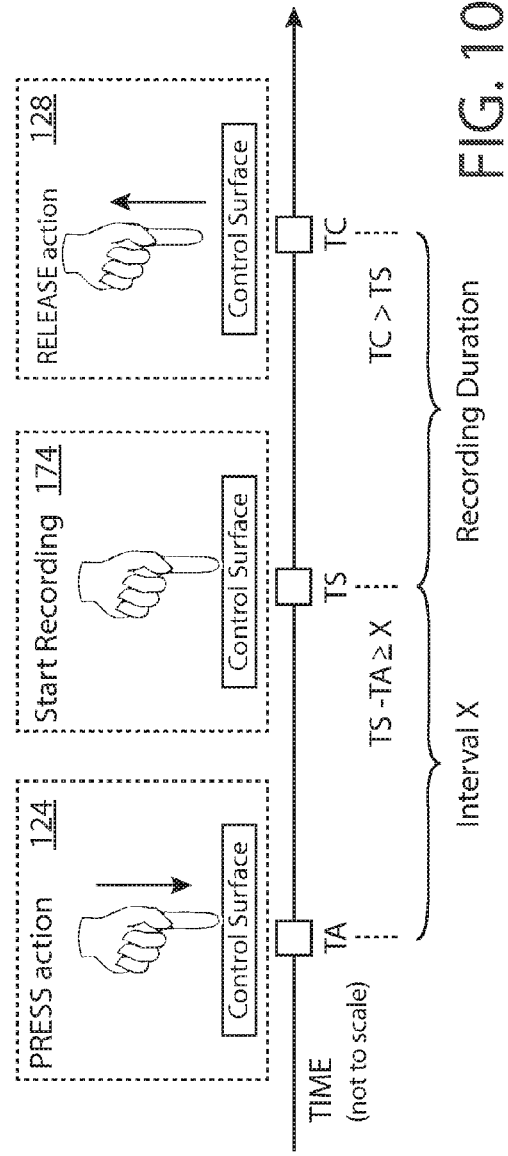

DEVICE AND METHOD FOR PHOTO AND VIDEO CAPTURE

REFERENCE TO RELATED APPLICATIONS

This application is a continuation of U.S. patent application Ser. No. 14/579,096, filed Dec. 22, 2014, which is a continuation of U.S. patent application Ser. No. 13/596,041, filed Aug. 25, 2012, the entire contents of each is incorporated herein by reference in their entirety.

FIELD THE INVENTION

This relates to devices and methods for photo and video capture with a single user input element. The same single user input element in an image capture device is used in performing both photo capture and video capture.

BACKGROUND OF THE INVENTION

Image capture devices with the ability to capture both static content, such as still images, and dynamic content, such as moving images embodied as video or audiovisual content, have become widely available. Historically, still cameras for still images were distinct in design and functionality from video cameras for moving images. For instance, there has been a long history of some cameras designed for photography and other cameras designed for cinematography. Technological developments in image capture devices, however, has enabled the proliferation of cameras with the ability to capture both still images and moving images.

Even if the same camera has the ability to capture both static and dynamic image content, the camera's user interface must be able to distinguish between the user's instruction for still image capture and the user's instruction for moving image capture. Various techniques have become conventionally known.

One technique is to use multiple buttons, each button assigned its own separate function. One button may be assigned to initiate photo capture. Another button may be assigned to initiate video capture. Commercial shoot-and-point cameras have been known to employ this technique of a separate photo button and a separate video button. This technique can be disadvantageous in a number of ways. For example, multiple buttons may require more hardware and its associated costs in design and manufacturing, as compared to a single button. As another example, multiple buttons may occupy extra space on the form factor of the camera device. As many modern camera devices are small in size for convenience and portability, there is limited space for user input elements, such as buttons.

Another set of conventional techniques is directed to using a single capture button with multiple capture functions. A first example employs a separate mode selection button to toggle between photo capture mode and video capture mode. In photo capture mode, operating the single capture button initiates photo capture. In video capture mode, operating the same single capture button initiates video capture. Handheld smartphones have been known to employ this technique of a separate mode selection button to toggle between photo capture mode and video capture mode. This technique can be disadvantageous because an extra user operation is required to switch between these two modes. Specifically, before the user operation of pressing the capture button, the extra user operation of pressing the mode selection button and the subsequent mode change are required. This extra user operation and mode change introduces a noticeably long time delay before the user can press the capture button. During that long time delay, the user may miss the opportunity to capture the desired photo or video.

A second example employs a single user input element that functions both as a mode selection input and as a capture button of a camera, as shown in U.S. Patent Application Publication No. 2004/0061788 A1 to Bateman. Specifically, each of these two functions is implemented by a different physical manipulation of the single user input element. For the function of mode selection, the physical manipulation of sliding the single user input element selects the different capture modes of the camera. For the function of capture, the physical manipulation of pressing the single user input element initiates capture.

Different modes of the camera are selected by a user operation of sliding the single user input element between two different slide positions. In a first slide position, the camera is in still image capture mode, and pressing the single user input element initiates still image capture. In a second slide position, the camera is in video capture mode, and pressing the single user input element initiates video capture.

The technique of this second example can be disadvantageous in a number of ways. First, an extra physical manipulation of a different type is required to switch between these two modes. Specifically, before the physical manipulation of pressing the single user input element, the extra physical manipulation of sliding the single user input element is required. Pressing and sliding are different types of physical manipulation. This extra physical manipulation of a different type introduces a noticeably long time delay before the user can press the single user input element. During that long time delay, the user may miss the opportunity to capture the desired photo or video. Additionally, accommodating multiple sliding positions may require more hardware and its associated costs in design and manufacturing, as compared to a single button occupying a single location. Furthermore, multiple sliding positions may occupy extra space on the form factor of the camera device.

SUMMARY OF THE INVENTION

Various embodiments involve an image capture apparatus comprising an image sensor, a timing reference, a single user input element, and a processor block configured to control a method for photo capture and video capture. Other embodiments involve a machine-readable medium for an image capture device directed to a method for photo capture and video capture. A method for photo capture and video capture involves steps for performing photo capture and steps for performing video capture.

Some embodiments involve engaging a timing reference at a first reference time based on a first user interface activity at the single user input element. In a first case, a second reference time is based on a second user interface activity at the single user input element, the timing reference indicates a passage of time between the two reference times is shorter than a particular time interval, and still image capture is performed. In a second case, the timing reference indicates a passage of time since the first reference time is equal to or longer than the particular time interval, and video capture is started. In the second case, video capture is stopped based on a subsequent user interface activity at the single user input element. The reference time for a corresponding user interface activity may be equal to or later than the time when the corresponding user interface activity occurs at the single user input element.

In some embodiments, the steps for performing photo capture involve engaging a timing reference at two reference times based on two user interface activities at the single user input element. After determining that a timing reference indicates that a passage of time between the two reference times is shorter than a particular time interval, still image capture is performed based on the determination. The reference times may be equal to or later than the two times when the two user interface activities occur at the single user input element.

In some embodiments, the steps for performing video capture involve engaging a timing reference at a first reference time based on a first user interface activity at the single user input element. After determining that a timing reference indicates a passage of time since the first reference time is equal to or longer than the particular time interval, video capture is started based on the determination. Based on another user interface activity at the single user input element, the video capture is stopped. The first reference time may be equal to or later than the time when the first user interface activity occurs at the single user input element.

Implementing the single user input element with the time-based approach disclosed herein distinguishes from other approaches based on multiple buttons and multiple types of physical manipulation. Comparative advantages may include reduced hardware and its associated costs in design and manufacturing, increase in available space on the form factor of a camera device, removal of the noticeably long time delay of alternating between multiple modes and multiple user operations, and increased simplicity in user interface experience.

In some embodiments, all of the user interface activities at the single user input element comprise detecting actions based on the same type of physical manipulation of the single user input. The corresponding user actions on the single user input all belong to the same type of physical manipulation. Compared to the known use of multiple types of physical manipulation of a single user input element, the aspect of using the same single type of physical manipulation can lead to further advantages, such as removal of the noticeably long time delay of alternating between multiple types of physical manipulations, further reduced hardware and its associated costs in design and manufacturing a single user input element that operates via multiple types of physical manipulation, further increase in available space on the form factor of a camera device, and further increased simplicity in user interface experience.

In some embodiments, some user interface activities involve detecting press actions on the single user input element, and other user interface activities involve detecting release actions from the single user input element. Employing press and release actions may provide a convenient user experience.

In some embodiments, some user interface activities involve a change in the state of the single user input element from OFF to ON, and other user interface activities involve a change in the state of the single user input element from ON to OFF. Employing ON and OFF states may provide a convenient implementation of a single user input element.

In some embodiments, photo capture and video capture employ the same image sensor. Employing the same image sensor may provide benefits in reduced hardware costs and increased device portability.

In some embodiments, the single user input element is one of a button, a key, a screen area of an input display, and a touch-sensitive area of a touchscreen. Such various examples indicate that the single user input element may be embodied in any suitable form in accordance with the teachings disclosed herein.

BRIEF DESCRIPTION OF THE DRAWINGS

FIG. 7 illustrates exemplary user activity.

FIG. 8 shows a temporal sequence of user events related to photo capture.

FIG. 9 shows a temporal sequence of user events related to video capture start.

FIG. 10 shows a temporal sequence of user events related to video capture stop.

DETAILED DESCRIPTION OF THE INVENTION

In the following description of preferred embodiments, reference is made to the accompanying drawings which form a part thereof, and in which it is shown by way of illustration specific embodiments in which the invention can be practiced. It is to be understood that other embodiments can be used and structural changes can be made without departing from the scope of the embodiments of this invention.

Overall System Design of the Preferred Embodiment

Figure 1:
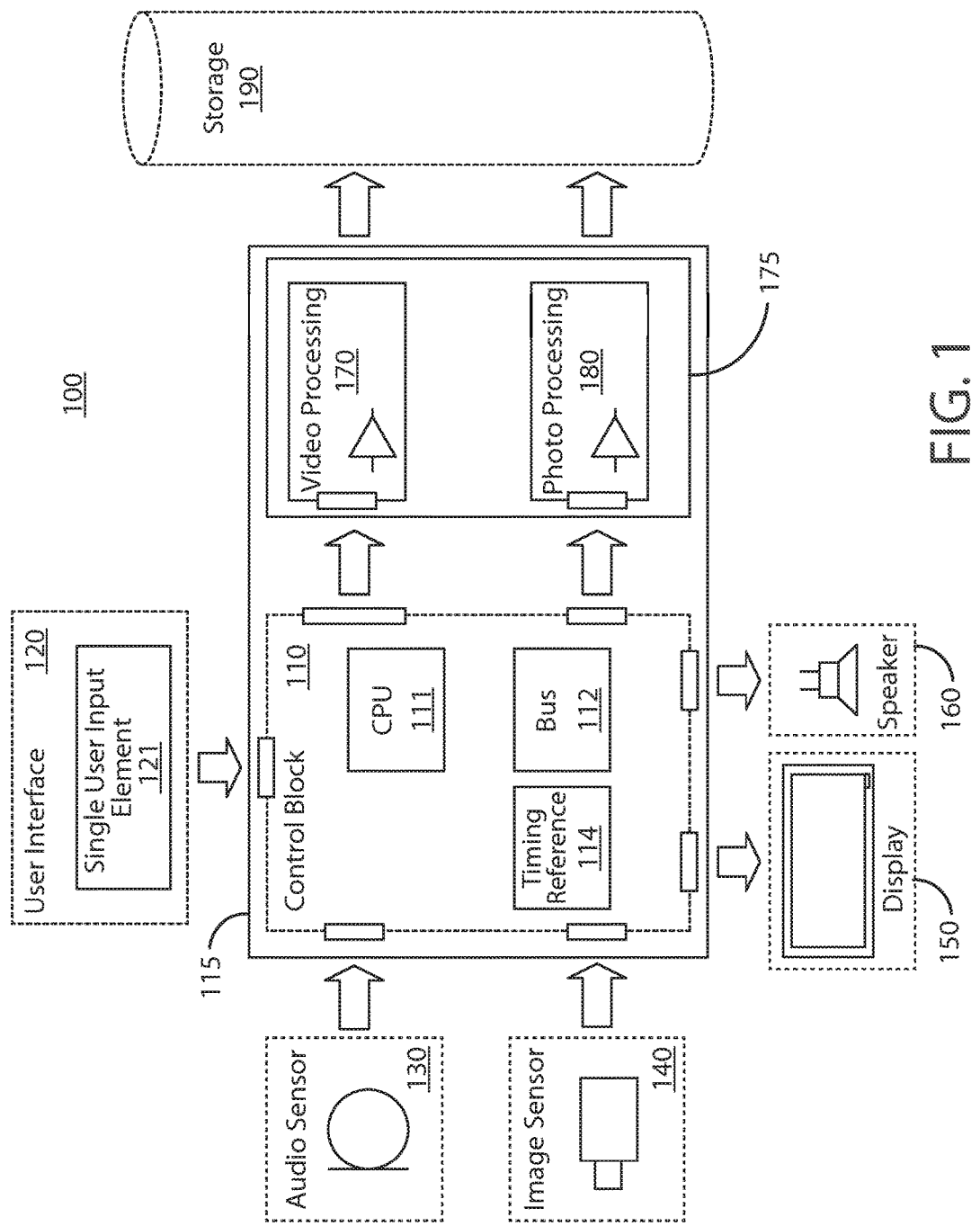
FIG. 1 is a block diagram of an overall system design in a preferred embodiment.

FIG. 1 is a block diagram of an overall system design in a preferred embodiment 100. Embodiment 100 may be implemented with any device configured to capture, process, store, or transmit (or any combination of the above steps) both photos and videos utilizing image sensors, such as image sensor 140. Such a device may also utilize audio sensors, such as audio sensor 130.

A user may issue commands to embodiment 100 to effectuate the capture of photo and/or video content. The user may be external to embodiment 100.

Control block 110 may represent the sequence of interactions between the user and embodiment 100 resulting in control commands and leading to the capture of photo and/or video content. Control block 110 may be implemented with central processing unit (CPU) 111, bus 112, and timing reference 114. CPU 111 may comprise one or more processors. Bus 112 may comprise one or more buses interconnecting the various components of embodiment 100. Timing reference 114 may be embodied as any way or component involved with timing references, such as one or more timers, one or more clocks, a combination of timer(s) and clock(s), and any process or component that provides the functionality of a clock or timer. Using or engaging timing reference 114 includes various timing-related activities, such as indicating event times, starting timers, reading clocks or timers, indicating passage of time, setting or registering reference times, etc.

User interlace 120 is configured to intermediate the interactions between the embodiment 100 and the user. Via user interface 120, the user may effectuate the execution of the processes of control block 110. User interface 120 may also provide feedback about the results of various processes. User interface 120 may be implemented with visual, acoustic, tactile, or proximity elements (or any combination of the above elements). As a result of user interaction with user interface 120, control block 110 may generate a control command, such as a signal that affects the rest of the system of embodiment 100 (e.g., a Capture Photo signal, a Start Video signal, a Stop Video signal).

Audio sensor 130 registers acoustic input data and may transform acoustic input data into electrical audio signals for further processing. The acoustic input data can be processed based on the commands from control block 110, in connection with producing photo or video content. Audio sensor 130 may represent one or more audio sensors.

Image sensor 140 registers visual input data and transforming visual input data into electrical image signals further processing. The visual input data can be processed based on commands from control block 110, in connection with producing photo or video content. Image sensor 140 may represent one or more image sensors.

Display 150 can provide a real-time visual display of the image signals generated by image sensor 140. Display 150 may be structurally integrated with embodiment 100 as a unitary device.

Speaker 160 is an audio reproduction device used to produce audible output, such as audible feedback. Speaker 160 may be structurally integrated with embodiment 100 as a unitary device.

Video processing 170 represents a set of transformations and the equipment and control processes involved to produce video content based on the image signal generated by the image sensor 140. The video content may be produced based also on the audio signal generated by audio sensor 130. The video content is a dynamic sequence of images captured by image sensor 140, which may be simultaneously captured with synchronized audio captured by audio sensor 130. The video content may be processed and formatted for storage, subsequent retrieval, and transmission.

Photo processing 180 represents a set of transformations and the equipment and control processes involved to produce photo content from the image signal generated by image sensor 140. The photo content may be produced based also on the audio signal generated by audio sensor 130. The photo content is a static image (a momentary representation) captured by image sensor 140, which may be simultaneously captured with synchronized audio captured by audio sensor 130. The photo content may be processed and formatted for storage, subsequent retrieval, and transmission.

Storage 190 may store video content from video processing 170. Storage 190 may store photo content from photo processing 180. Storage 190 may be embodied as any suitable storage medium for storing video content or photo content, including the non-limiting examples of tape storage on magnetic tape, disk storage on a hard disk drive, flash memory of solid-state semiconductor memory.

Embodiment 100 in FIG. 1 represents relevant processes and components. These relevant processes and components may be implemented by any suitable hardware configuration. For example, video processing 170 and photo processing 180 are illustrated as separate blocks but may be described together as image processing 175. Video processing 170 and photo processing 180 may be implemented respectively as a separate video processor component and a separate photo processor component. Alternatively, they may be embodied as a single image processor component corresponding to image processing 175. Additionally, any combination of video processing 170, photo processing 180, image processing 175, and CPU 111 may be implemented as one or more processors. Some or all of the elements shown in control block 110 and image processing 175 may be embodied in a single integral structure or a single collection of components, as shown by processing block 115.

Figure 12:
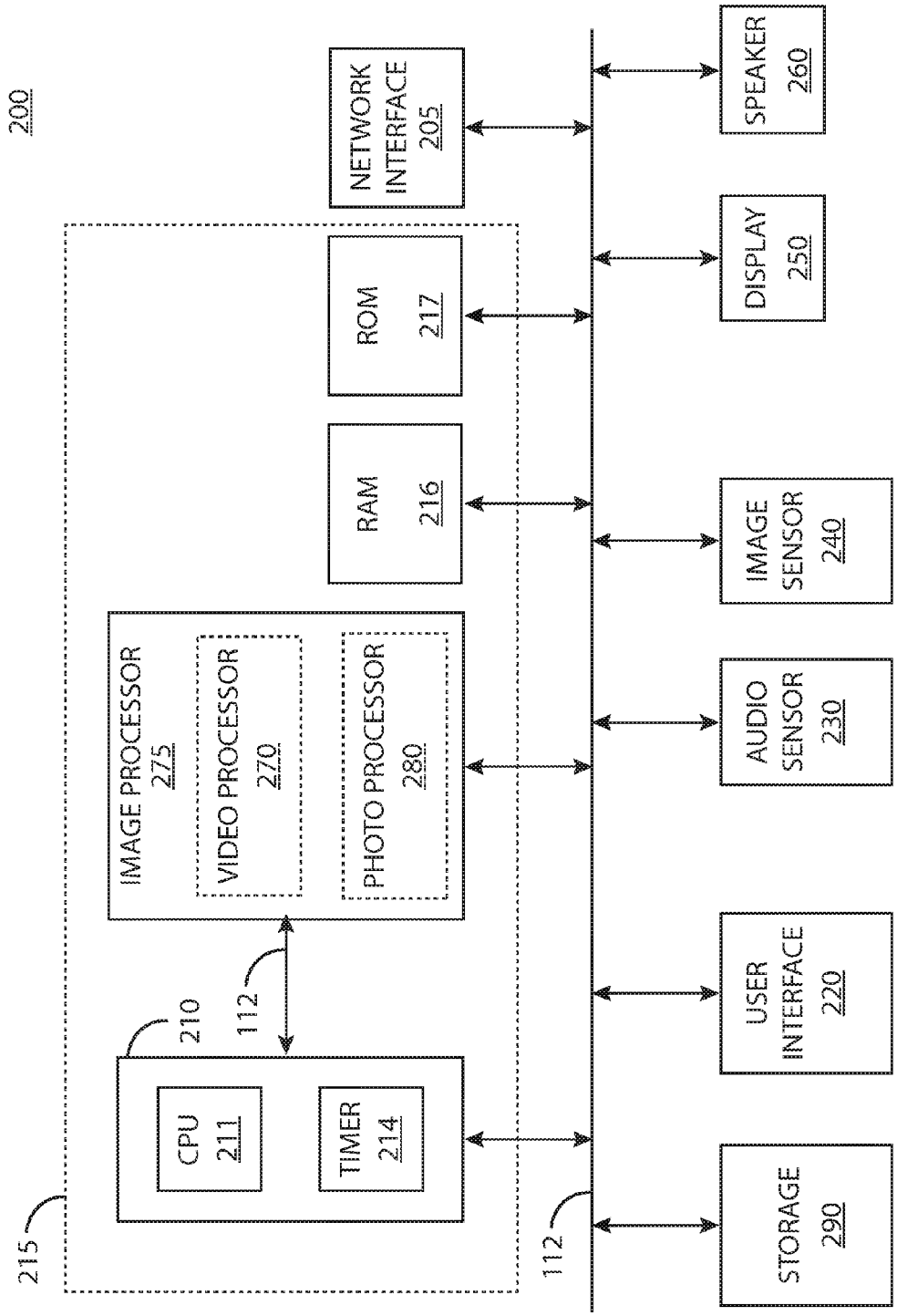
FIG. 12 shows an exemplary hardware embodiment.

FIG. 12 illustrates a hardware embodiment 200 for implementing design embodiment 100. The components in FIG. 12 have reference characters that are numbered in a corresponding fashion to the reference characters in FIG. 1. Hardware embodiment 200 may be implemented in devices including, but not limited to, a portable camera phone, smartphone, digital camcorder, digital camera, tablet computer, laptop computer, desktop personal computer (PC), personal digital assistant (PDA), media player, and a combination of two or more of these devices.

Control block 210 may be implemented with CPU 211 and timing reference 214. Bus 112 may connect control block 210 to image processor 275. Image processor 275 may comprise video processor 270 and photo processor 280. Methods and processes disclosed herein may be embodied as instructions stored on a machine-readable storage medium, such as random access memory (RAM) 216 or read-only memory (ROM) 217. One or more processors, such as CPU 211, may execute these instructions to cause embodiment 100 to perform the methods and processes disclosed herein. Some or all of the elements shown in control block 210 and image processor 275 may be embodied in a single integral structure or a single collection of components, as shown by processing block 215.

User interface 220 may be embodied as a single user input element, such as a button, a key, a screen area of an input display, a touch-sensitive area of a touchscreen, etc. Audio sensor 230 may be embodied as a microphone. Image sensor 240 may be embodied as one or more image sensors. Display 250 may be embodied as a preview display for image signals from image sensor 140. Display 250 may be structurally separate from user interface 220 or structurally integrated with user interface 220, such as a touchscreen as an input/output device. Speaker 260 may be embodied as one or more speakers or one or more audio output ports to an audio peripheral, e.g., headphones. Storage 290 may be embodied as any suitable storage medium for storing video content or photo content, including the non-limiting examples of tape storage on magnetic tape, disk storage on a hard disk drive, and flash memory of solid-state semiconductor memory. Network interface 205 may be embodied as any suitable connection (e.g., physical data port, virtual data port, infrared connection, wireless radio frequency (RF) connection, etc.) to a communications network (e.g., a local area network, a storage area network, the Internet, cellular data network, etc.) via a propagation medium (e.g., electrical wires, optical fiber, acoustic space, wireless signals, RF signals, etc.). Data may enter or leave embodiment 200 via network interface 205, including program instructions for RAM 216 or ROM 217 and including photo or video data for storage 290. The various components of embodiment 200 may be interconnected by any suitable arrangement of interconnections, as represented by bus 112.

User Interface and Actions

User interface 120 comprises a single actionable user input element 121 (e.g., a button, a key, a screen area of an input display, a touch-sensitive area of a touchscreen, etc.). Element 121 can indicate two states ON and OFF. Element 121 may be in the OFF state. The user can change the state of element 121 to ON by applying a first action (e.g., button press, screen touch). Element 121 can indicate the ON state for a duration of time. For instance, the user may apply the first action during the duration of time. The user can change the state of element 121 to OFF by applying a second action (e.g., button release, screen touch release). For instance, the second action may be ceasing the first action so that the first action is no longer applied to element 121, returning element 121 to the OFF state.

The first action and the second action on the single user input element 121 may belong to the same type of physical manipulation. For example, the first action and the second action may involve a pressure type of physical manipulation, as in applying pressure to a button and releasing pressure from the button. As another example, the first action and the second action may involve a contact type of physical manipulation, as in contacting a touch-sensitive surface and removing contact from the touch-sensitive surface. As a further example, the first action and the second action may involve a proximity type of physical manipulation, as in entering a proximity detection region and exiting a proximity detection region.

Hereinafter, the user interaction leading to the state of actionable element 121 switching from OFF to ON is referred to as a "PRESS" action, and the user interaction leading to state of actionable element 121 switching from ON to OFF is referred to as a "RELEASE" action. The time elapsed between a PRESS action and a subsequent RELEASE action is referred to as "HOLD time." During HOLD time, the user may perform a "HOLD action" by continuing to apply the PRESS action to element 121. Embodiments are not limited to a pressing action and a releasing action but may also include other actions.

FIG. 7 illustrates exemplary user activity. PRESS action 124 shows the action of a user moving a finger into contact with a control surface. RELEASE action 126 shows the action of a user moving a finger out of contact with a control surface. FIG. 7 also shows an idle status 121 where a user is idling and not contacting a control surface.

Hereinafter, a predetermined duration of time is referred to as "Interval X." The duration of Interval X may be a plurality of seconds, a second, or a fraction of a second. The relevance of Interval X is further explained below.

Idle

Figure 2:
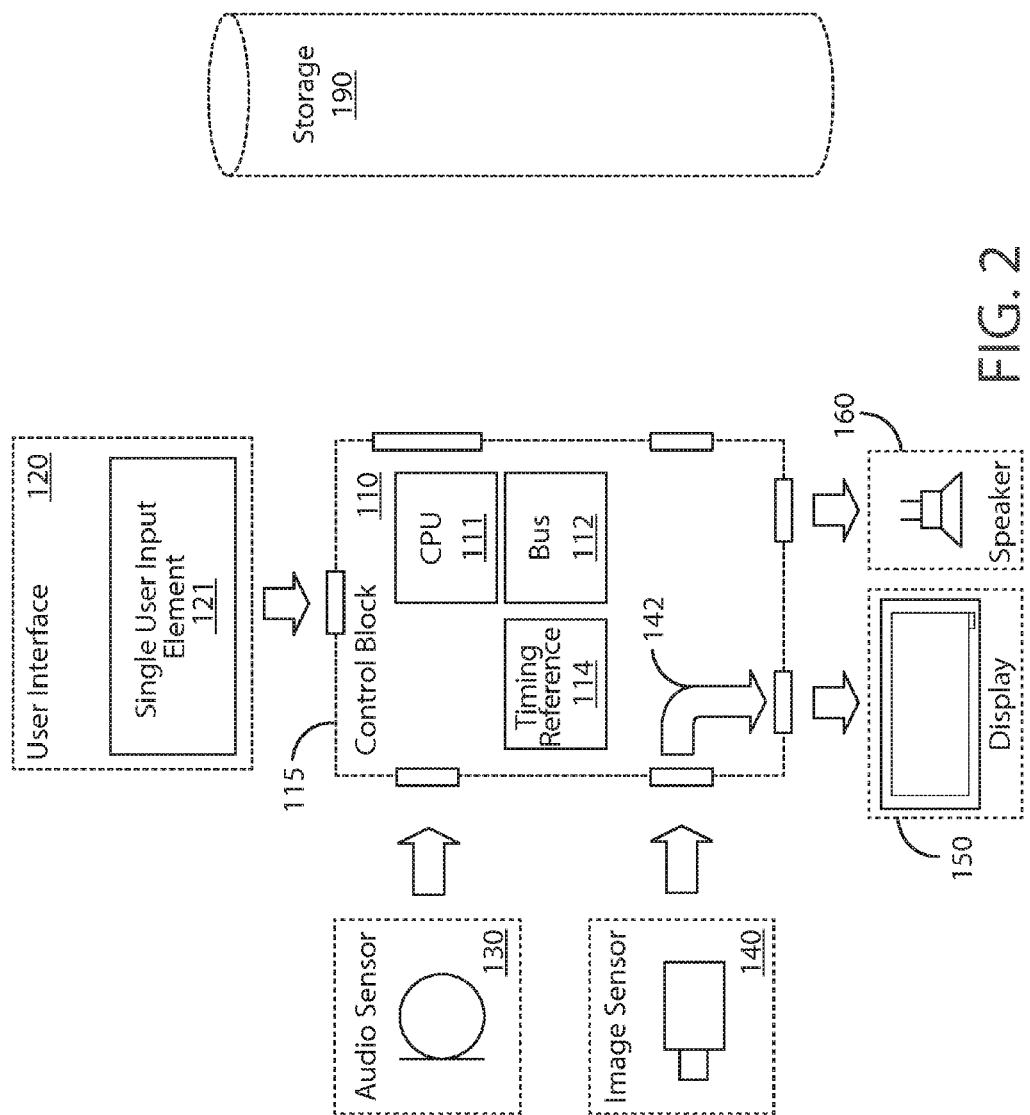
FIG. 2 illustrates an embodiment in an idle status.

FIG. 2 illustrates embodiment 100 in an idle status. Image sensor 140 is connected to display 150, as shown by connection 142 via bus 112. Display 150 may show a real-time preview of image signals generated by image sensor 140. User input element 121 is in the OFF state.

Photo Capture

FIG. 8 shows a temporal sequence of user events related to photo capture. In order to perform photo capture, a user may execute the following sequence of stages:

Stage P1. While embodiment 100 is in an Idle status (as in FIG. 2), the user changes the state of element 121 to ON. As exemplified in FIG. 8, the user performs a PRESS action 124 on user input element 121 at time TA.

Stage P2. The state of element 121 remains ON for a period of time shorter than Interval X, e.g., the user performs a HOLD action for a HOLD time less than Interval X.

Stage P3. The user changes the state of element 121 to OFF. As exemplified in FIG. 8, the user performs a RELEASE action 126 on user input element 121 at time TB. The time difference between time TB and time TA is less than Interval X. When the state of element 121 is OFF, embodiment 100 performs photo capture at time TB or later.

Figure 3:
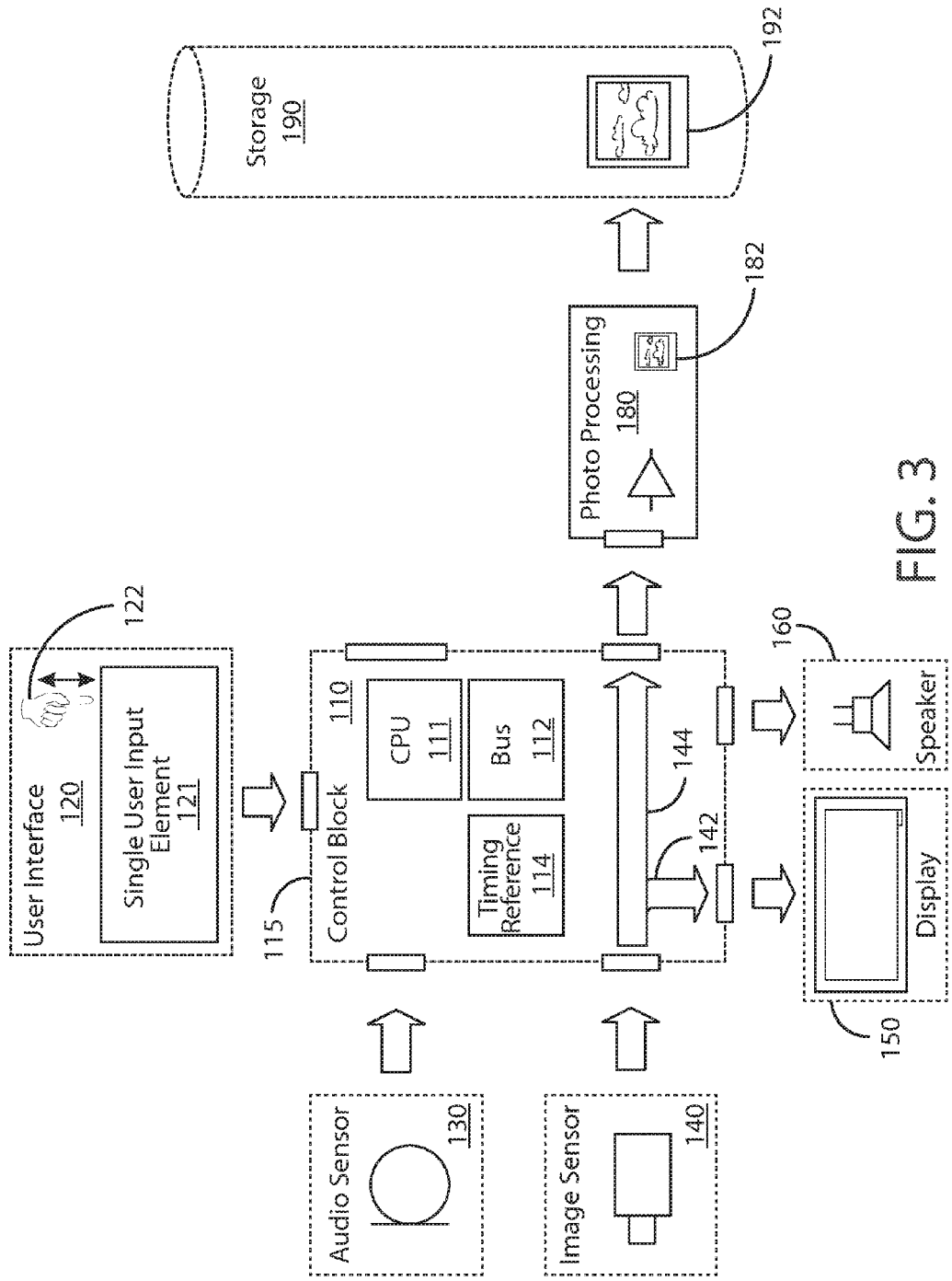
FIG. 3 illustrates an embodiment in connection with photo capture.
Figure 4:
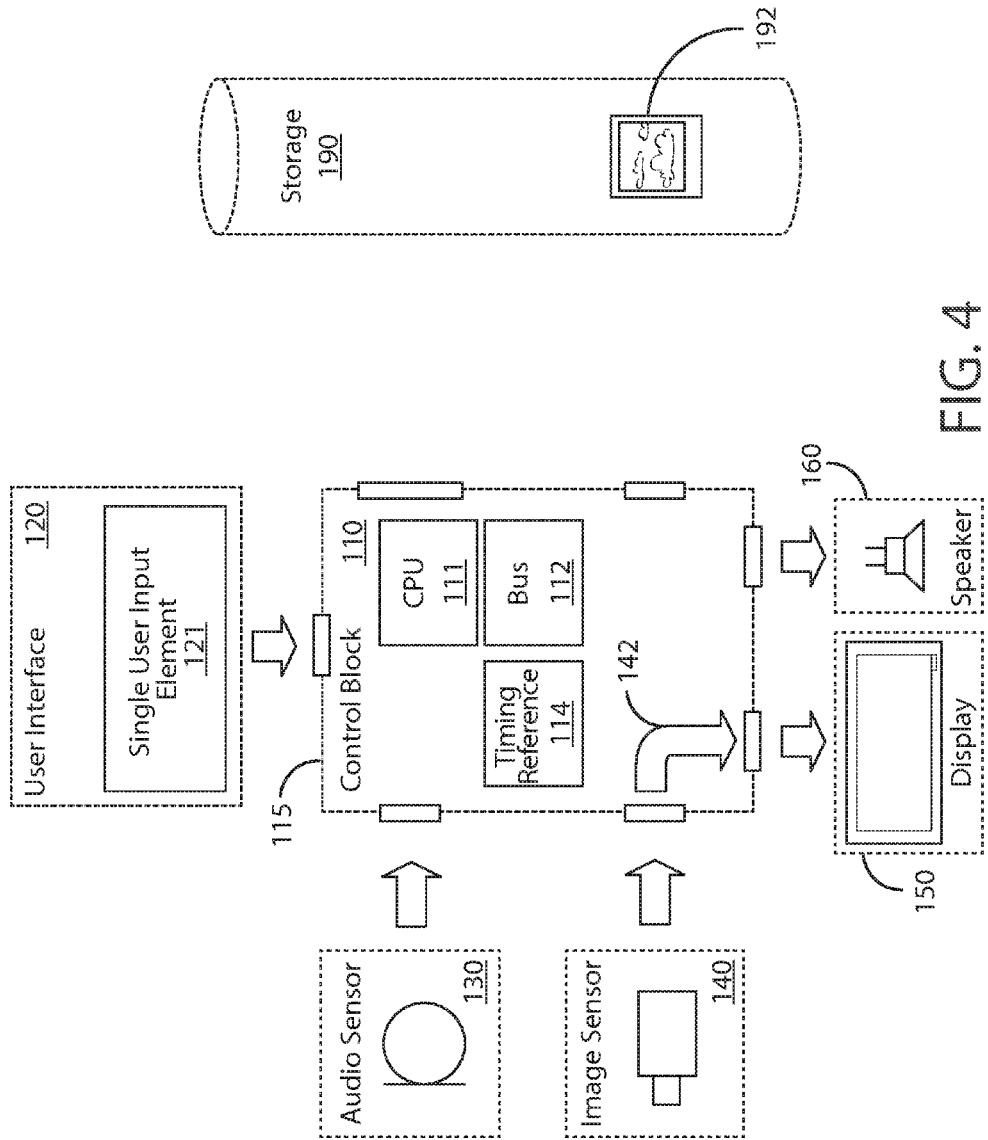
FIG. 4 illustrates an embodiment in an idle status after photo capture.

Photo capture may also be described, in terms of embodiment 100 and FIGS. 2-4. During stages P1-P3, embodiment 100 progresses through the statuses shown in FIGS. 2-4. The idle status of FIG. 2 is described above.

FIG. 3 illustrates embodiment 100 in connection with photo capture. User activity 122 represents the combination of PRESS action 124 and RELEASE action 126 of FIG. 8. Image sensor 140 is connected to display 150, as shown by connection 142 via bus 112. Display 150 may show a real-time preview of image signals generated by image sensor 140. Image sensor 140 is also connected to photo processing 180, as shown by connection 144 via bus 112. Timing reference 114 is referenced to determine that user input element 121 remains ON for a period of time shorter than Interval X. Photo processing 180 captures initial image 182. Photo processing 180 may further transform or process initial image 182 into final image 192 for storage and/or transmission. Photo processing 180 may store final image 192 into storage 190 and may transmit final image 192 to another destination.

FIG. 4 illustrates embodiment 100 in an idle status after photo capture. This idle status of FIG. 4 may correspond to the idle status of FIG. 2, as discussed above. In this idle status of FIG. 4, storage 190 may contain final image 192.

Photo capture can be enhanced to provide feedback to the user about the progress and the final result of stages P1-P3. Audio feedback enhancements may utilize speaker 160. A distinct audio signal can indicate that photo capture has been triggered. A distinct audio signal can indicate that photo capture has been triggered and successfully completed. A distinct audio signal can indicate that photo capture has been triggered and failed.

Visual feedback enhancements may utilize display 150. A distinct visual signal can indicate that photo capture has been triggered. A distinct visual signal can indicate that photo capture has been triggered and successfully completed. A distinct visual signal can indicate that photo capture has been triggered and failed.

Video Capture

FIG. 9 shows a temporal sequence of user events related to video capture start. FIG. 10 shows a temporal sequence of user events related to video capture stop. In order to perform video capture, a user operator may execute the following sequence of stages:

Stage V1. While embodiment 100 is in an Idle status (as in FIG. 2), the user changes the state of element 121 to ON. As exemplified in FIG. 9, the user performs a PRESS action 124 on user input element 121 at time TA.

Stage V2. The state of element 121 remains ON for a period of time equal to or longer than Interval X, e.g., the user performs a HOLD action for a HOLD time equal to or greater than Interval X. When element 121 remains ON for a period of time equal to or longer than Interval X, embodiment 100 initiates the recording of video content, as reflected by start recording event 174 at preset time TS or later in FIG. 9. The time difference between time TS and TA is equal to or greater than Interval X.

Stage V3. The user changes the state of element 121 to OFF. As exemplified in FIG. 10, the user performs a RELEASE action 128 on user input element 121 at time TC. When the state of element 121 is OFF, embodiment 100 stops the recording of video content at time TC or later.

Figure 5:
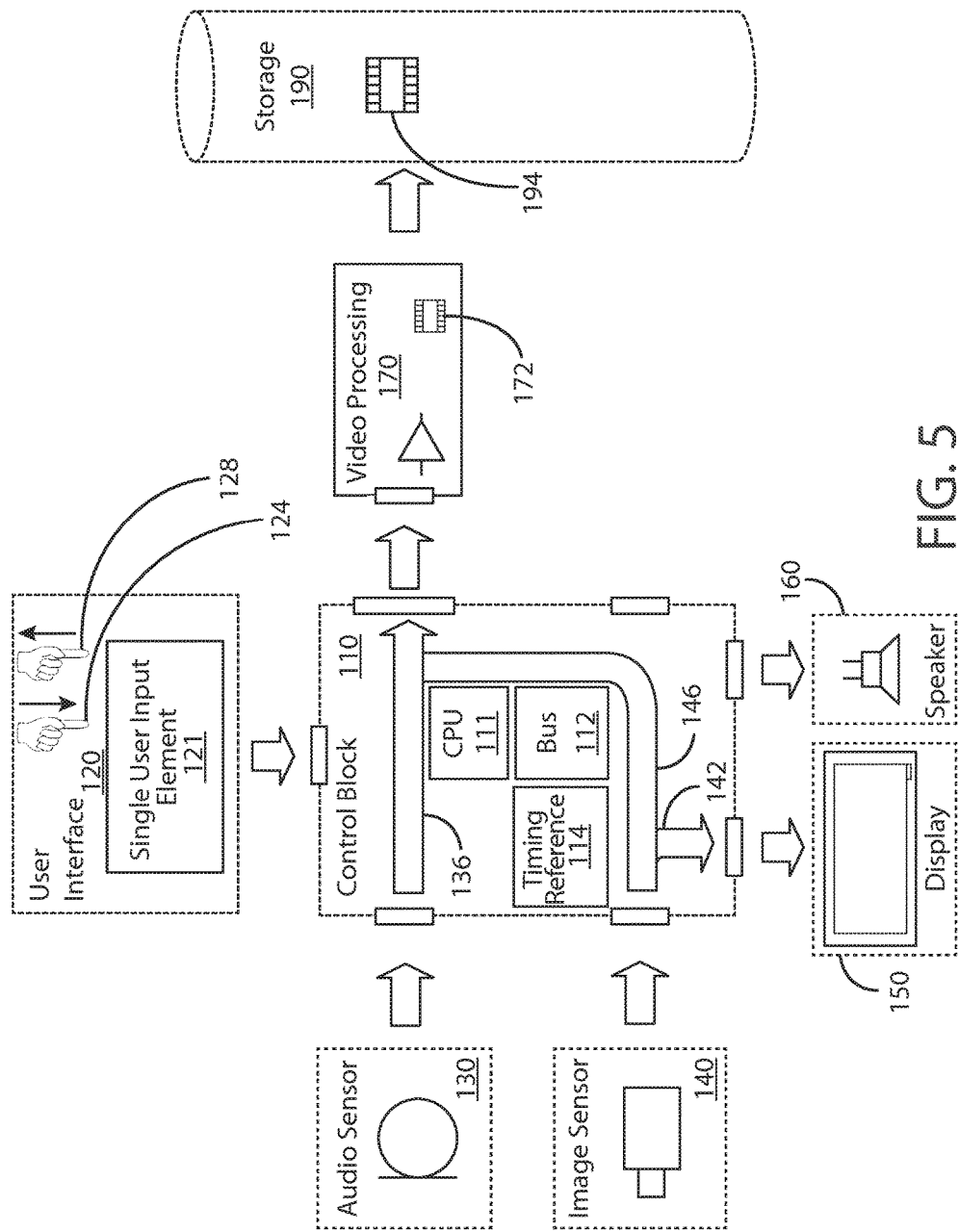
FIG. 5 illustrates an embodiment in connection with video capture.
Figure 6:
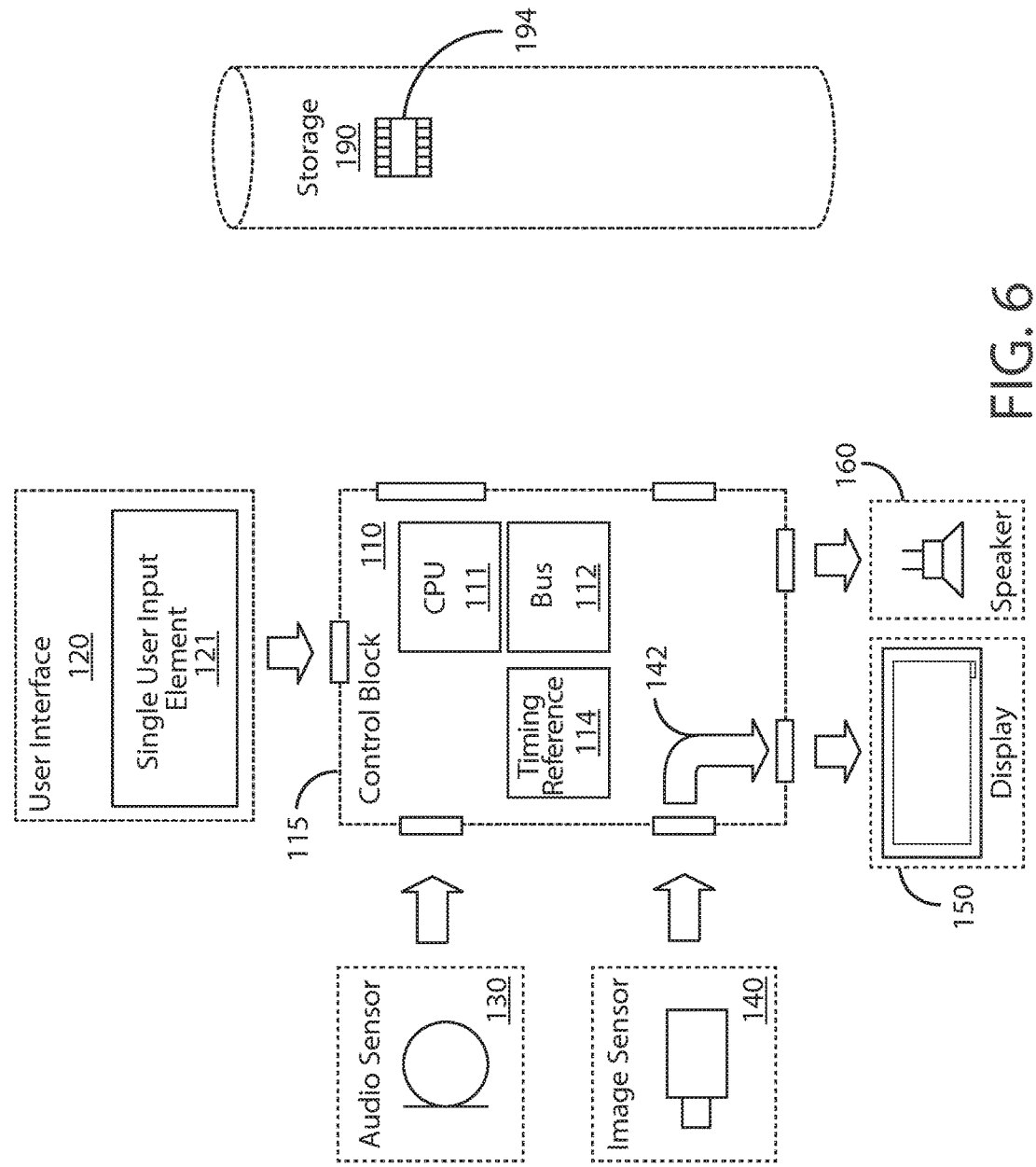
FIG. 6 illustrates an embodiment in an idle status after video capture.

Video capture may also be described in terms of embodiment 100 and FIGS. 2 and 5-6. During stages V1-V3, embodiment 100 progresses through the statuses shown in FIGS. 2 and 5-6. The idle status of FIG. 2 is described above.

FIG. 5 illustrates embodiment 100 in connection with video capture. User activities 124 and 128 respectively correspond to PRESS action 124 and RELEASE action 128 of FIG. 10. Image sensor 140 is connected to display 150, as shown by connection 142 via bus 112. Display 150 may show a real-time preview of image signals generated by image sensor 140. Image sensor 140 is also connected to video processing 170, as shown by connection 146 via bus 112. Timing reference 114 is engaged to determine that user input element 121 remains ON for a period of time equal to or longer than interval X. In order to capture initial video 172, video processing 170 captures video data from image sensor 140 via connection 146 and may also capture audio data from audio sensor 130 by connection 136 via bus 112. Video processing 170 may further transform or process initial video 172 into final video 194 for storage and/or transmission. Video processing 170 may store final video 194 into storage 190 and may transmit final video 194 to another destination.

FIG. 6 illustrates embodiment 100 in an idle status after photo capture. This idle status of FIG. 6 may correspond to the idle status of FIG. 2, as discussed above. In this idle status of FIG. 6, storage 190 may contain final video 194.

Video capture can be enhanced to provide feedback to the user about the progress and the final result of stages V1-V3. Audio feedback enhancements may utilize speaker 160. A distinct audio signal can indicate that video recording has been triggered. A distinct audio signal can indicate that video recording has been triggered and successfully completed. A distinct audio signal can indicate that video recording has been triggered and failed.

Visual feedback enhancements may utilize display 150. A distinct visual signal can indicate that video recording has been triggered. A distinct visual signal can indicate the current duration of recording. A distinct visual signal can indicate that video recording has been successfully completed. A distinct visual signal can indicate that video recording has failed.

Operational Diagram of the Preferred Embodiment

Figure 11:
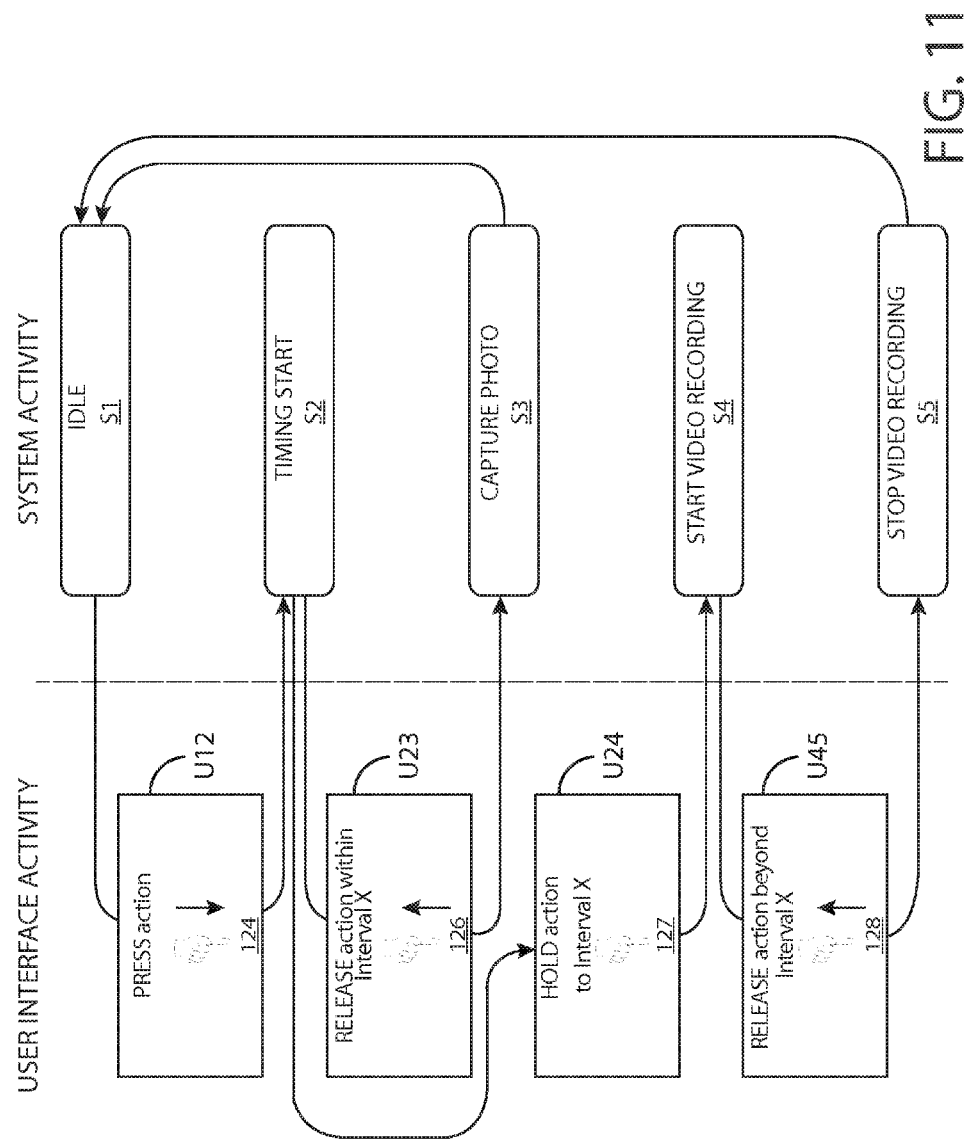
FIG. 11 shows an exemplary operational diagram.

The methods and processes disclosed herein may also be described in terms of operational diagrams. FIG. 11 shows an exemplary operational diagram in accordance with the preferred embodiment of the present invention. The left side of FIG. 11 shows activity at user interface 120 of embodiment 100. The right side of FIG. 11 shows activity of other portions of the system of embodiment 100.

State S1 is an idle state of embodiment 100. Image sensor 140 may be operating. Display 150 may be showing a live preview of image signals generated by image sensor 140. User input element 121 is in the OFF state. Optionally, display 150 may show visual cue(s) on or around a control surface of user interface 120, indicating the OFF state of element 121 and prompting the user to perform an action (e.g., a prompt for a PRESS action).

State S2 is a timing start state of embodiment 100. When the state of element 121 changes to ON, embodiment 100 transitions from idle state S1 to timing start state S2 via activity U12. User interface activity U12 is exemplified as detecting a user interacting with the control surface of user interface 120 via a PRESS action 124. Optionally, display 150 may show visual cue(s) on or around the control surface of user interface 120, indicating the ON state of element 121.

In timing start state S2, embodiment 100 may engage timing reference 114 to register a time TA, which is the time when the state of element 121 changes to ON or a later point in time. Timing reference 114 may be engaged to start an interval timer or read an interval clock. By engaging timing reference 114, embodiment 100 determines whether the state of element 121 remains ON for a period of time shorter than Interval X or whether the state of element 121 remains ON for a period of time equal to or longer than Interval X. In the former case, embodiment 100 transitions to capture photo state S3. (For example, the interval timer or clock indicates time TB when the state of element 121 changes to OFF, and the interval timer or clock indicates a passage of time less than Interval X.) In the latter case, embodiment transitions to start video recording state S4. (For example, the interval timer or clock indicates a passage of time equal to or greater than Interval X.)

State S3 is a capture photo state of embodiment 100. Embodiment 100 can transition from timing start state S2 to capture photo state S3 via activity U23. Based on user interface activity U23, the state of element 121 changes to OFF. User interface activity U23 is exemplified as detecting the user interacting with the control surface of user interface 120 via a RELEASE action 126 at a time point within Interval X. Photo capture includes capturing an output image signal of image sensor 140 to provide captured photo data. Photo processing 180 processes the captured photo data for storage or transmission. Optionally, photo processing 180 may store the processed photo data into storage 190 for persistence. Optionally, embodiment 100 may provide visual and/or audio cue(s) indicating that photo capture has been successful (e.g., animation, sound). After photo capture, embodiment 100 may transition to idle state S1 and display visual cue(s) on or around the control surface of user interface 120, indicating the OFF state of element 121.

State S4 is a start video recording state of embodiment 100. Embodiment 100 can transition from timing start state S2 to start video recording state S4 via activity U24. The state of element 121 remains ON for a period of time equal to or longer than Interval X. User interface activity U24 is exemplified as detecting the user interacting with the control surface of user interface 120 via HOLD action 127 (e.g., continuing PRESS action 124) to Interval X. Starting video recording includes starting capturing an output image signal of image sensor 140 to provide captured video data. Starting video recording to provide the captured video data may also include starting capturing an output audio signal of audio sensor 130. Video processing 170 starts processing the captured video data. Optionally, video processing 170 may store the processed video data into storage 190 for persistence. Optionally, embodiment 100 may provide visual and/or audio cue(s) indicating that video recording has successfully started (e.g., animation, sound).

State S5 is a stop video recording state of embodiment 100. Embodiment 100 can transition from start video recording state S4 to stop video recording state S5 via activity U45. User interface activity U45 is exemplified as detecting the user interacting with the control surface of user interface 120 via a RELEASE action 128 at a time point beyond the end of Interval X. Stopping video recording includes stopping capturing an output image signal of image sensor 140 and may also include stopping capturing an output audio signal of audio sensor 130. Video processing 170 finishes processing the captured video data to provide a video for storage or transmission. Optionally, video processing 170 may store the video into storage 190 for persistence. Optionally, embodiment 100 may provide visual and/or audio cue(s) indicating that video recording has successfully ended (e.g., animation, sound). After video capture, embodiment 100 may transition to idle state S1 and display visual cue(s) on or around the control surface of user interface 120, indicating the OFF state of element 121.

Example Interactions

The following discussion provides non-limiting examples of interactions with embodiment 100. From the perspective of a user, the user utilizes the single user input element 121 in two distinct patterns in order to acquire different representations of visual content.

As a first interaction pattern, the user may employ a relatively short interaction with element 121. For instance, the first interaction pattern may comprise a sequence of a brief touch and a release or a sequence of a brief press and a release. The time duration of the first interaction pattern is shorter than a pre-defined time interval, Interval X. The first interaction pattern triggers still image acquisition (e.g., static picture).

As a second interaction pattern, the user may employ a relatively longer interaction with element 121. For instance, the second interaction pattern may comprise a prolonged touch and a release or a sequence of a prolonged press and a release. The time duration of the second interaction pattern is longer than the pre-defined time interval, Interval X. The second interaction pattern triggers the start of recording a dynamic (audio/video) representation of visual content. The release of element 121 triggers the end of the recording.

Alternative Embodiments

The following discussion provides additional non-limiting embodiments. Another embodiment employs a single-touch camera-mode selection/execution button. The button enables control over the selection and execution of a still camera and a video camera on a single device using a single button. In a first scenario, when the button is pressed and released quickly, the still camera is selected and takes still photo in a photo mode. In a second scenario, when the button is held down, the video camera is selected and takes a video taken for as long as the button is depressed in a video mode. Upon releasing the button, the video camera stops taking the video in the video mode. The photo and video modes are accessed and controlled by user via the same button and can be switched easily by the user using the two aforementioned scenarios.

Yet another embodiment is directed to combination Video Camera/Still Camera devices. Conventional combination Video Camera/Still Camera devices use a switch to toggle back and forth from Video Camera operation mode to Still Camera operation mode. This embodiment employs a single button to automatically switch hack and forth between Video Camera operation mode and Still Camera operation mode without the need for a separate switch or toggle. When a user presses and holds the single button for a relatively long period of time (e.g., approximately 1-1.5 seconds or longer), the Video Camera is automatically engaged. As long as the user continues to press/hold the single button, the Video camera is engaged. Upon release of the single button, the operation mode is automatically switched back to Still Camera mode. When a user presses and quickly releases the single button, a photo is taken. The user can press/hold the single button at any time to automatically re-engage the Video Camera mode. The user can switch unlimited times between Still Camera operation mode and Video Camera operation mode by either pressing and holding the single button for Video using the Video Camera mode or by pressing and quickly releasing the single button for Photo using the Still Camera mode.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. An image capture device comprising:
   an image sensor capable of being configured to capture an image or a video,
   a single user input element capable of detecting a first action from a user;
   a processor connected to the image sensor and configured to:
      determine a duration that a user applies the first action to the single user input element, store an image from the image sensor based on the duration being less than a time interval; and
      store the video from the image sensor based on the duration being greater than the time interval; and
   the image sensor further being configured to capture the video starting after the user applies the first action and to continue to capture the video for a portion of the duration, based on the duration being greater than the time interval.

2. The image capture device of claim 1, wherein the duration is measured based on the first action and a second action.

3. The image capture device of claim 2, wherein the first action is a user touching the single user input element and the second action is the user releasing the single user input element.

4. The image capture device of claim 1, further comprising:
   a timing reference within the processor,
   wherein the processor uses the timing reference to determine the duration of the first action.

5. The image capture device of claim 1, further comprising:
   a touchscreen,
   wherein the single user input element is a touch-sensitive area of the touchscreen.

6. The image capture device of claim 1, wherein the processor is configured to transmit the image or video.

7. The image capture device of claim 6, wherein the processor is configured to transform the image or the video prior to transmitting.

8. A method comprising:
   receiving a first indication that a single user input element has detected a first action from a user;
   determining a duration of time that the first action is applied to the single user input element;

in response to the duration being less than a time interval, storing an image from the image sensor; and in response to the duration being more than the time interval, storing video from the image sensor, wherein the video is captured after the receiving of the first indication that the single user input element detected the first action from the user.

9. The method of claim 8, wherein determining the duration includes determining an elapsed time from receiving the first indication to receiving a second indication that the single user input element has detected a second action from the user.

10. The method of claim 8, wherein the first action is a user touching the single user input element and the second action is the user releasing the single user input element.

11. The method of claim 10, further comprising:
transmitting the image or the video.

12. The method of claim 11, further comprising:
transforming the image or the video prior to transmitting.

13. The method of claim 8, further comprising:
displaying a visual signal regarding the status of the image or video capture.

14. A non-transitory computer readable storage medium storing therein instructions that, when executed by a processor, cause an image capture device to perform a method comprising:

receiving a first indication that a single user input element has detected a first action from a user;

determining a duration of time that the first action is applied to the single user input element;

in response to the duration being less than a time interval, storing the image from the image sensor; and in response to the duration being more than the time interval, storing the video from the image sensor, wherein the video is captured after the receiving of the first indication that the single user input element detected the first action from the user.

15. The computer readable storage medium of 14, wherein determining the duration includes determining an elapsed time from receiving the first indication to receiving a second indication that the single user input element has detected a second action from the user.

16. The computer readable storage medium of claim 14, wherein the first action is a user touching the single user input element and the second action is the user releasing the single user input element.

17. The computer readable storage medium of claim 16, wherein the method further comprises transmitting the image or the video.

18. The computer readable storage medium of claim 17, wherein the method further comprises transforming the image or the video prior to transmitting.

19. The computer readable storage medium of claim 14, wherein the method further comprises displaying a visual signal regarding the status of the image or video capture.

* * * * *

UNITED STATES PATENT AND TRADEMARK OFFICE
CERTIFICATE OF CORRECTION

PATENT NO. : 9,560,264 B2  
APPLICATION NO. : 15/048361  
DATED : January 31, 2017  
INVENTOR(S) : Marlin et al.

It is certified that error appears in the above-identified patent and that said Letters Patent is hereby corrected as shown below:

In the Claims

In Column 12, Line 25, in Claim 1, delete "video," and insert --video;-- therefor In Column 14, Line 10, in Claim 15, after "of", insert --claim--

Signed and Sealed this  
Tenth Day of April, 2018

Andrei Iancu  
*Director of the United States Patent and Trademark Office*